Jan. 5, 1971  J. J. BYRNE ETAL  3,553,031
ELECTROCHEMICAL CELLS
Filed Sept. 17, 1968
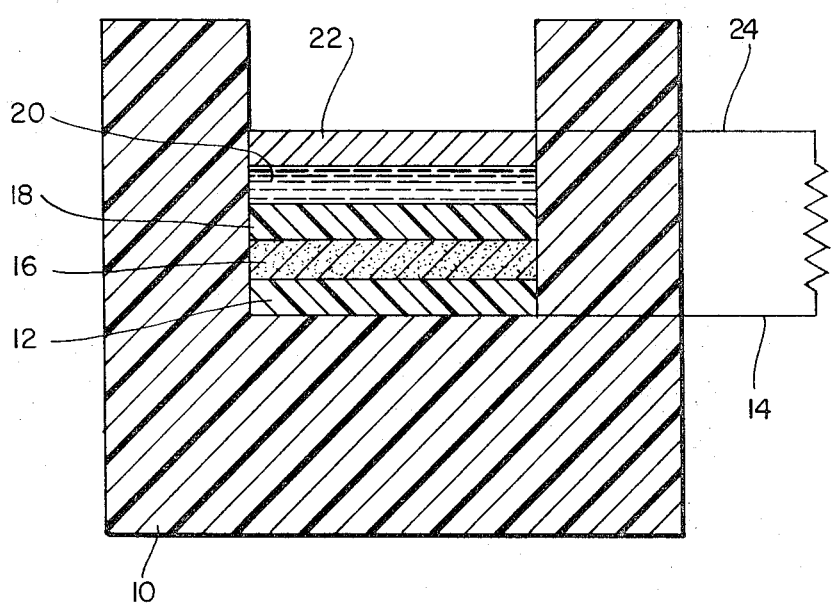
INVENTORS
DAVID L. WILLIAMS
JOSEPH J. BYRNE
BY
ATTORNEY

United States Patent Office 3,553,031
Patented Jan. 5, 1971

3,553,031
ELECTROCHEMICAL CELLS
Joseph J. Byrne, Marblehead, and David L. Williams, Reading, Mass., assignors to Monsanto Research Corporation, St. Louis, Mo., a corporation of Delaware
Continuation-in-part of application Ser. No. 600,212, Dec. 8, 1966. This application Sept. 17, 1968, Ser. No. 760,321
Int. Cl. H01m 13/00, 17/00
U.S. Cl. 136—100
17 Claims

ABSTRACT OF THE DISCLOSURE

An electrochemical cell characterized by a high energy density in combination with a high current density having an anode system containing lithium, a cathode system containing monohaloisocyanuric acid or dihaloisocyanuric acid or trihaloisocyanuric acid or mixtures thereof and a nonaqueous electrolyte system comprising methyl formate.

---

This application is a continuation-in-part of U.S. patent application Ser. No. 600,212, filed Dec. 8, 1966, now abandoned.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

(1) The field of the invention

This invention relates to electrochemical cells. More precisely, the invention disclosed herein relates to primary electrochemical cells comprising lithium containing anode systems, organic cathode depolarizer systems and nonaqueous electrolyte systems.

(2) Description of the prior art

Primary electrochemical cells are well known to the art. The essential systems of conventional primary cells include an anode system, a cathode depolarizer system and an electrolyte system. The anode system of such cells comprises a metal high on the electromotive series and/or alloys based on such metals; the cathode depolarizer system comprises generally an inorganic oxidizing agent as the cathode depolarizer. Normally, the depolarizer system further includes a particulate conductive material, usually carbon. The electrolyte system employed in conventional cells is an aqueous solution of electrolyte. Primary cells which as manufactured include the electrolyte system are referred to as "dry" cells, whereas primary cells to which the electrolyte system is added just prior to use are referred to as "reserve" cells. When a primary cell is connected into a complete electrical circuit, electrical energy is produced by the oxidation of the anode metal and the reduction of the cathode depolarizer. Additional details relating to primary cells can be found in U.S. Pats. 2,874,079 and 3,081,204 which are incorporated herein by reference.

Lithium metal and lithium based alloys are eminently qualified as materials for anode systems of primary cells because of the inherently high potential of lithium as well as the high ampere-hour capacity per unit weight or volume thereof. However, as those skilled in the art know, the use of lithium as an anodic material imposes severe restrictions and limitations on the selection of materials used in the other essential systems of the cell. For example, primary cells employing lithium anodes generally do not utilize aqueous-based electrolyte systems. Instead, the inherently high reactivity or potential of lithium requires the use of nonaqueous electrolyte systems in order to assure efficient operation of the cell. Moreover considerable care must be taken in the selection of materials for the cathode system of cells employing lithium anodes. Indeed such problems inherent in the use of lithium in anode systems of primary cells have been so perplexing that to date, the art has been unable to develop a primary cell having a lithium anode or a lithium based metal alloy anode system which can operate in a fashion consistent with the potential effectiveness predicted for lithium.

SUMMARY OF THE INVENTION

In accordance with the present invention, we have produced a highly efficient primary cell characterized by a high watt-hour and high ampere-hour capacity per unit of volume or weight, a high flat operating voltage over a wide range of current densities and a low cost. The primary cells of the present invention comprise three essential systems; an anode system containing lithium metal and/or a lithium based alloy, a cathode system containing a particular class of halogen containing organic depolarizers and a nonaqueous electrolyte system. Quite surprisingly, the outstanding characteristic of cells employing the particular cathode systems of the present invention is their high energy densities in combination with high current densities; a feature not obtained in cells which have heretofore employed lithium anode systems.

DESCRIPTION OF THE PREFERRED EMBODIMENTS

The anode, cathode and electrolyte systems of the novel cell of the present invention can be employed in conventional primary cells such as those described in U.S. Pats. 2,874,079 and 3,081,204 and the manner and form in which the systems can be so employed are conventional and widely known to those in the field to which the invention pertains. However, in the most preferred embodiment of the present invention, the systems are most advantageously employed in the configuration of the cell disclosed in U.S. Pat. 3,260,620 to Gruber. Broadly, a typical cell of the type described in the aforementioned patent to Gruber comprises a cell in which electrolytic connection between the current collectors, e.g., anode and cathode, is made through a separator which moves past the active electrode sites. In a preferred embodiment of the invention set forth in the Gruber patent, the separator also functions as a carrier for at least one of the electrochemical reaction components.

The preferred embodiment of our invention will be better understood by reference to the figure which illustrates a cut away section of a simplified arrangement of elements suitable for practicing our invention.

Referring now to the figure there is shown a recessed body 10 fabricated of a suitable nonconductive material such as polypropylene or the like. Disposed at the bottom of the recess of body 10 is a cathode current collector 12 which as shown, is a thin strip of a noble conductive metal such as platinum or platinum based alloys. Attached to the cathode current collector is lead wire 14.

The organic cathode depolarizer mix 16, preferably either coated on or in the form of a continuous porous tape, is an essential feature of our invention. We have discovered that an especially effective organic depolarizer for cathode systems of cells of the present invention is a particular organic depolarizer containing positive halogens. More precisely, the organic depolarizer of cells of our invention is one comprising a six membered ring containing alternating carbon and nitrogen atoms. Each carbon atom is attached to either an oxygen atom, or a hydroxyl radical. Accordingly, the ring can be saturated or unsaturated. Attached to at least one nitrogen atom is an available positive halogen atom, preferably chlorine. The organic cathode depolarizers of the present invention are represented by the following structures:

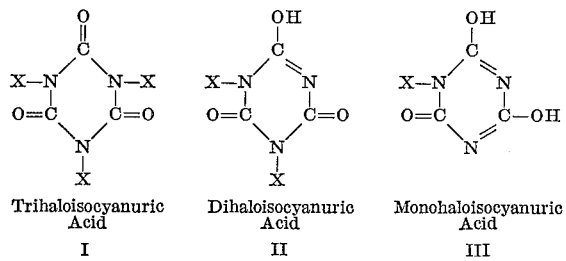

Trihaloisocyanuric Acid  I  
Dihaloisocyanuric Acid  II  
Monohaloisocyanuric Acid  III where X is a halogen, preferably chlorine.

Of the above structures, compounds corresponding to Formula II are especially preferred.

The organic depolarizers of the above structures are preferably employed as a "cathode mix" in combination with a finely divided conductive carbon such as Shawinigan Acetylene Black or graphite. The relative proportions of organic depolarizer to conductive material in the mix can vary depending upon such factors as the porosity and structural integrity of the ultimate tape desired. Normally, however, the organic cathode depolarizer should be present in amounts greater than about 50% by weight of the final composition and the best balance of properties is obtained when the amount of depolarizer is between about 70% to about 95% by weight of the final composition.

When the cathode mix of the present invention is employed in the form of a porous tape or as a coating on a tape, it is advantageous to include a minor amount of fibers, preferably carbon fibers to impart integrity and resiliency to the final tape without sacrificing the conductivity properties thereof. Generally the amount of carbon fibers employed need not exceed 10% by weight of the final composition but larger amounts can be employed. Oftentimes, paper pulp can be also employed to obtain improved intgerity, resiliency as well as wettability in the tape. The ingredients of the cathode mix can be homogeneously mixed dry or in the form of slurries or dispersions in manners known to the art. The mixture can be fabricated into a tape by molding techniques known to the art. Oftentimes minor amounts of an inert binder can be included in the mix if desired.

Returning now to the figure, directly above cathode mix 16 (shown in the form of a coating on a tape) is a thin porous separator 18 fabricated of a nonconductive material. The separator should be thin as possible, preferably no thicker than about 10 mils. Suitable materials for the separator include any of the substantially nonconductive relatively inert natural and synthetic materials normally employed in the fabrication of porous membranes and the like. For example, polypropylene is eminently suitable as a material for separator 18.

When the cell of the figure is operational, separator 18 is saturated with an electrolyte system shown schematically as 20. The electrolyte systems of the present invention comprise solutes in methyl formate. Broadly, the solutes useful in the practice of the present invention are those which can provide solutions having a conductivity of about $10^{-2}$ ohms$^{-1}$ cm.$^{-1}$. The especially preferred solute is lithium perchlorate, and solutions thereof in methyl formate ranging in concentrations of from about 1 M to saturated concentrations are the preferred electrolyte systems. However solutes produced by the combination of perfluoro or perchloro Lewis acids and alkali metal chlorides or fluorides can also be employed in the practice of the present invention. Representative solutes of this type include among others, $LiAsF_6$, $KPF_6$, $LiBF_4$, $LiPF_6$, $LiAlCl_4$ and the like.

The electrolyte system can be introduced to the cell of the figure in many ways. For example, an injection means (not shown) can be employed to inject the electrolyte system in controlled amounts directly between the separator 18 and anode 22. Also, the electrolyte system can be encapsulated and incorporated into the tape containing the cathode depolarizer mix. Of course, means to rupture the encapsulated electrolyte system as it passes between cathode and anode current collectors must be provided if such a technique is involved. Alternatively, the separator 18 can be applied to or carried by the tape containing the cathode mix. Means to coat the separator with electrolyte as it passes between anode and cathode current collectors can be conveniently included in a cell employing this technique.

The final element of the cell of the present invention is an anode system containing a lithium or lithium based alloy, e.g., anode 22, which is also preferably in the form of a thin strip. Anode 22 is attached to lead wire 24 which completes the circuit of the cell of the figure.

Means to convey the tape containing or carrying the cathode mix 16 between cathode current collector 12 and separator 18 at a controlled rate are now shown since such means are conventional and known to the art and moreover the systems of the present invention can also be advantageously employed in primary cell configurations.

The following example is given by way of illustration and in no way is it to be construed to limit the invention beyond those limitations expressly set forth in the present specification or in the claims which appear hereinafter.

EXAMPLE 1

In order to illustrate the efficiency of a cell comprising electrochemical systems of the present invention, a small scale test cell is constructed essentially as shown in the figure. The internal diameter of the recess in the body is 3 in.$^2$ (3″ x 1″). A thin copper plate is placed in the bottom of the recess and connected to an external lead wire. A 3″ x 1″ platinum cathode current collector is placed on top of and in contact with the copper plate. A 3″ x 1″ tape carrying the cathode depolarizer is fabricated as follows.

Mix these ingredients in a Waring Blendor for about 1 minute:

|   | Grams |
|---|---|
| Dichloroisocyanuric acid | 1.5 |
| Shawinigan acetylene black | 0.28 |
| Carbon fibers | 0.02 |

After mixing, place the mixture in a 3″ x 1″ mold and apply a pressure of about 300 p.s.i. to produce a tape about 50 mils thick.

The tape is then placed on top of and in contact with the platinum current cathode collector. A porous-polypropylene (3″ x 1″) separator about 3 mils thick is placed on the tape and 1.4 ml. of a 2 M solution of lithium perchlorate in methyl formate is distributed evenly over the top of the separator to impregnate all portions of the separator with the electrolyte system. A 3″ x 1″, 15 mil lithium ribbon is then placed on the electrolyte-impregnated separator. The lithium anode is attached to an external lead wire and the lead wires of the anode and cathode current collector are connected in series with an ammeter and a resistive load (1 ohm resistor). The potential difference across the resistor was continually maintained at 3.2 volts with a constant voltage power supply in order to simulate the discharge conditions of a cell of the type described in the aforementioned Gruber patent. The battery loop current was continually monitored over the discharge time. The results obtained for the performance of such test cells over various discharge times are set forth below.

TABLE 1.—CONSTANT VOLTAGE DISCHARGE TESTS Li/2 M LiClO₄ IN METHYL FORMATE

Cell weight

|  | G. |
|---|---|
| Anode—15 mil lithium ribbon (3 in.²) | 0.30 |
| Separator—3 mil (3 in.²) | 0.05 |
| Electrolyte—1.4 ml. (d=1.15 g./ml.) | 1.61 |
| Cathode (3 in.²)— | |
| Dichloroisocyanuric acid | 1.50 |
| Shawinigan acetylene black | 0.28 |
| Carbon fibers | 0.02 |
|  | 3.76 |

Electrical characteristics

Operating potential—3.2 volts
Cathode efficiency @ 18 hrs.—71%

| Discharge time (hr.) | Average current density | | Energy density (watt-hr./lb.) |
|---|---|---|---|
|  | ma./in.² | ma./cm.² |  |
| 4 | 37 | 5.8 | 173 |
| 8 | 22 | 3.4 | 200 |
| 18 | 10 | 1.6 | 216 |

Those well skilled in the art will recognize that the combination of high energy density with high current density obtained in the cells of the present invention is an unusual characteristic not obtained heretofore in electrochemical cells employing lithium containing anode systems. Suitable cells can also be obtained when monohaloisocyanuric or trihaloisocyanuric acids are employed instead of the dichloroisocyanuric acid of the above example.

EXAMPLE 2

Substantially the same procedure as in Example 1 is followed but an electrolyte system of 2 M LiAsF₆ in methyl formate is employed instead of the 2 M LiClO₄ in methyl formate of Example 1. The results obtained are as follows:

Electrical characteristics

Operating potential—3.2 volts
Cathode efficiency @ 9.5 hrs.—63.4%

| Discharge time (hr.) | Average current density | | Energy density (watt-hr./lb.) |
|---|---|---|---|
|  | ma./in.² | ma./cm.² |  |
| 4 | 30 | 4.5 | 133 |
| 8 | 20 | 3.0 | 175 |
| 9.5 | 17 | 2.6 | 182 |

Cells employing solutions of LiAsF₆ in methyl formate as electrolyte systems are especially advantageous since they can operate at low temperatures (4° C.) with surprisingly little gassing.

EXAMPLE 3

The following table illustrates the discharge characteristics of cells employing different solutes in methyl formate in combination with cathode systems of di- and trihaloisocyanuric acids. The data was obtained in a device similar to that illustrated in FIG. 1 but having a constant current power supply in series with a resistor (30 ohms).

Many modifications of details offered in the above examples offered for the purposes of illustrating the invention can be employed without departing from the spirit and scope of the invention defined in the appended claims.

Having described our invention together with preferred embodiments thereof as well as manners of practicing same what we declare as new and desire to secure by U.S. Letters Patents is as follows:

1. An electrochemical cell having an anode system comprising lithium, an electrolyte system consisting essentially of a solution in methyl formate of a solute chosen from the group consisting of lithium perchlorate and solutes produced by the combination of perchloro and perfluoro Lewis acids with alkali metal chlorides and fluorides and a cathode system comprising an organic depolarizer system wherein the organic depolarizer of said depolarizer system is chosen from the group consisting of trihaloisocyanuric acid, dihaloisocyanuric acid, monohaloisocyanuric acid and mixtures thereof.

2. The cell of claim 1 wherein said depolarizer is trichloroisocyanuric acid.

3. The cell of claim 1 wherein said depolarizer is dichloroisocyanuric acid.

4. The cell of claim 1 wherein said depolarizer is monochloroisocyanuric acid.

5. The cell of claim 1 wherein said depolarizer system comprises a conductive carbon.

6. The cell of claim 1 wherein said depolarizer system comprises a finely divided conductive material.

7. The cell of claim 1 wherein said electrolyte system is a solution of lithium perchlorate in methyl formate.

8. The cell of claim 1 wherein said electrolyte system is a 2 molar solution of lithium perchlorate in methyl formate.

9. The cell of claim 1 wherein said electrolyte system is a solution of lithium fluoroarsenate in methyl formate.

10. The cell of claim 1 wherein said depolarizer system comprises a minor amount of carbon fibers.

11. The cell of claim 1 wherein said depolarizer system comprises from about 50 to 95% by weight of a depolarizer chosen from the group consisting of trichloroisocyanuric acid, dichloroisocyanuric acid and monochloroisocyanuric acid, and mixtures thereof, from about 5 to about 40% by weight of a finely divided, particulate, conductive material and from about 1 to about 20% by weight of carbon fibers.

12. A cell of claim 11 wherein said finely divided, particulate, conductive material of said depolarizer system is a conductive carbon.

13. The cell of claim 12 wherein said depolarizer system contains about 80% depolarizer by weight, about 16% by weight conductive carbon and further said system contains about 4% by weight of carbon fibers.

14. An electrochemical cell having an anode system comprising lithium, an electrolyte system comprising a solution having from about 1 molar to about saturation concentration lithium perchlorate in methyl formate and an organic depolarizer system wherein said depolarizer is dichloroisocyanuric acid.

15. The cell of claim 14 wherein said electrolyte system is a 2 molar solution of lithium perchlorate in methyl formate.

DISCHARGE OF Li/CHLORINATED CYANURIC ACID COMPOUND TAPE CELLS IN METHYL FORMATE AT CONSTANT CURRENT

| Cathode | Electrolyte | Capacity, amp-min. | | | | Percent utilization at 2 volts |
|---|---|---|---|---|---|---|
|  |  | Initial | Electrochemical | | | |
|  |  |  | 3.0 v. | 2.5 v. | 2.0 v. |  |
| Trichloroisocyanuric acid | LiClO₄ | 19.3 | 1.8 | 4.5 | 5.4 | 28 |
| Do | KPF₆ | 19.8 | 1.8 | 4.2 | 5.2 | 26 |
| Dichloroisocyanuric acid | LiClO₄ | 14.8 | 3.0 | 6.3 | 7.2 | 49 |
| Do | KPF₆ | 17.0 | 2.4 | 3.6 | 6.6 | 39 |